Patented Jan. 10, 1950

2,493,797

UNITED STATES PATENT OFFICE 2,493,797

NITRO DERIVATIVE OF TERTIARY BUTYL ETHYL ANISOLE

Thomas F. Wood, Clifton, N. J., assignor to The Givaudan Corporation, a corporation of New Jersey No Drawing. Application July 5, 1947, Serial No. 759,299

1 Claim. (Cl. 260—612)

This invention relates to a nitro derivative of tertiary butyl ethyl anisole and to a process for preparing it.

It is known that products with a musk-like odor can be obtained by nitration of toluene, xylene, or pseudocumene derivatives which contain a substituted isopropyl, isobutyl, isoamyl, and tertiary-butyl group, and that by the substitution of halogen or organic radicals such as CN, CHO, COCH$_3$ and OCH$_3$ in the mentioned hydrocarbons, products possessing different varieties of odor are obtained. All of such synthetic musk products which have found extensive use in perfumery contain, as far as I am aware, a methyl (CH$_3$) group as one of the substituents on the benzene nucleus.

I have now found that a synthetic musk material can be prepared by nitrating a benzene derivative which contains no methyl group at all. The structural formula of my novel material may be represented by the following formula:

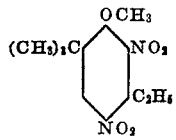

While the chemical configuration of my novel musk-like material bears a resemblance to the known musk ambrette, nevertheless it was indeed surprising to find that the presence of an ethyl (C$_2$H$_5$) group in the ring in place of methyl (such as is the case with musk ambrette) not only does not weaken the odor of the material— as would have been supposed, but in fact actually materially strengthens the musk character of the material. This has the effect of enabling a perfumer to obtain the desired musk characteristics by using less of my novel material than would be required if musk ambrette were employed. Moreover, another distinct and unexpected advantage of my material is that it is capable of imparting an odor which is similar to that of natural musks, which are entirely unrelated chemically and for some applications considered to be superior to the aforesaid synthetic musks.

In general, I prepare my novel musk-like material by first methylating meta-ethyl phenol to produce meta-ethyl anisole; then butylating the latter by means of isobutene and a catalytic amount of aluminum chloride, to form 3-ethyl-6-tertiary-butyl anisole; and finally, nitrating the latter at low temperature in the presence of acetic anhydride, to produce my novel musk material, 2,4-dinitro-3-ethyl-6-tertiary-butyl anisole.

A schematic representation of the chemical equations involved in my process follows:

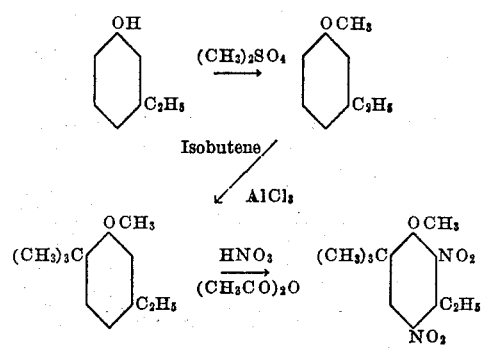

The methylation of the meta-ethyl phenol is accomplished by means of dimethyl sulfate and aqueous sodium hydroxide, in accordance with known procedures.

The butylation of the meta-ethyl anisole can be carried out by slowly feeding isobutylene into a chemically-equivalent amount of the meta-ethyl anisole at 20°-25° C., in the presence of about 2 to 3% of anhydrous aluminum chloride powder as catalyst. The amount of anhydrous aluminum chloride used is based on the weight of meta-ethyl anisole.

The nitration of the 3-ethyl-6-tertiary-butyl anisole is conducted at temperatures within the range of —20° C. to +20° C., in the presence of 1.5 to 2.5 times its weight of acetic anhydride, using 2 to 3 times the theoretical amount of 96–98% fuming nitric acid. It has been found desirable to feed the 3-ethyl-6-tertiary-butyl anisole into a mixture of nitric acid and acetic anhydride rather than reverse the procedure, in order to avoid the formation of tarry by-products.

Upon completion of the nitration, the crude product is obtained by quenching the reaction mixture on ice and then filtering. The crude nitration product is then washed until neutral and taken up in an excess of textile spirits (petroleum naphtha), at which point any by-products insoluble in an excess of textile spirits separate out. Evaporation of the textile spirits leaves the crude musk, which can be further purified by crystallization from 2 to 4 parts of alcohol, to give the pure 2,4-dinitro 3-ethyl-6-tertiary-butyl anisole, having a melting point of 77° C. and possessing a sweet, persistent musk-like odor.

The invention is illustrated by the following example without however limiting the same to it.

EXAMPLE

(a) Preparation of meta-ethyl anisole

In a mixture of 418 grams (3.43 moles) of pure meta ethyl phenol and 300 grams (2.38 moles) of dimethyl sulfate, cooled to 20° C. in a suitably provisioned apparatus, was slowly fed with stirring 1,075 grams of a 16.5% aqueous caustic soda solution maintaining the temperature below 30° C. Then, the mixture was stirred 1 hour at room temperature and 9 hours at 95° C. The upper layer was then settled, separated and extracted thoroughly with 5% caustic soda solution and washed with water. The product was vacuum distilled to give 388 grams of meta ethyl anisole, boiling point = 85° C. at 20 mm. From the caustic liquors was recovered 34 grams of meta ethyl phenol. The yield was 90.5% of theory.

(b) Preparation of 3-ethyl-6-tertiary-butyl anisole

Into a flask provided with a thermometer, efficient agitator and gas inlet tube was charged:

Meta ethyl anisole (M. W.=136) __ 328 grams (2.41 moles)
Aluminum chloride powder _____ 10 grams The temperature of the mixture was brought to 19° C. and there was passed in 50 liters (2.06 moles at 25° C.) of isobutene at the rate of 20 liters per hour over a 2½ hour period. The reaction mixture was kept between 19° C. and 25° C. during the addition. After 20 minutes longer, the crude product was washed neutral and vacuum distilled. There was obtained 340 grams of product, boiling point=87° C. at 4 mm., refractive index at 20° C.=1.5030, specific gravity at 25°= 0.9248, melting point = −16° C. to −17° C. There was recovered 71.5 grams of m-ethyl anisole. The yield was 94% of theory.

(c) Preparation of 2,4-dinitro-3-ethyl-6-tertiary-butyl anisole

A cold mixture of 82.1 grams (0.428 mole) of 3-ethyl-6-tertiary butyl anisole and 41 grams of acetic anhydride was slowly fed with stirring into a solution of −10° C. of 138 grams (2.15 moles) of 98% nitric acid and 123 grams of acetic anhydride. The temperature was maintained at 0 to +5° C. during the feeding and the time of feeding was 1 hour and 15 minutes. Toward the end of the nitration, crystals appeared in the mixture and at the end the contents of the flask was a greenish-yellow crystalline mush. The product was quenched on crushed ice and then filtered and washed neutral with water and soda ash solution. The crude product was dissolved by warming with ten times its weight of textile spirits. This solution on cooling deposited crystals of a light yellow powder insoluble in cold textile spirits. This compound is a by-product and melted at 88° C.–89° C. The textile spirits solution was evaporated and the reddish yellow residue crystallized from four times its weight of alcohol. The product was obtained in the form of fine pale-yellow needles, melting point=77° C., which had a strong persistent odor of musk. There was obtained 67.7 grams of this product for a weight yield of 82.5%.

This novel product can be employed as an artificial musk in perfumery in general, and has particular usefulness in perfumes employed in soap.

The foregoing illustrates the practice of this invention, which however, is not to be limited thereby but is to be construed as broadly as permissible in view of the prior art and limited solely by the appended claim.

I claim:

2,4-dinitro-3-ethyl-6-tertiary butyl anisole, comprising yellow crystals having a melting point of 77° C. and possessing a strong persistent musk-like odor.

THOMAS F. WOOD.

REFERENCES CITED

The following references are of record in the file of this patent:

UNITED STATES PATENTS

| Number | Name | Date |
| --- | --- | --- |
| 481,685 | Bauer | Aug. 30, 1892 |
| 1,926,080 | Borman | Sept. 12, 1933 |
| 2,007,234 | Wirth | July 9, 1935 |
| 2,007,241 | Dahlen et al. | July 9, 1935 |
| 2,166,917 | McCormack et al. | July 18, 1939 |